United States Patent
Lutz et al.

(10) Patent No.: US 9,964,241 B2
(45) Date of Patent: May 8, 2018

(54) CONNECTION ASSEMBLY

(71) Applicant: Keltech, Inc., Menomonee Falls, WI (US)

(72) Inventors: Ken Lutz, Hickory Corners, MI (US); Larry Hartman, Kalamazoo, MI (US)

(73) Assignee: Keltech, Inc., Menomonee Falls, WI (US)

( * ) Notice: Subject to any disclaimer, the term of this patent is extended or adjusted under 35 U.S.C. 154(b) by 726 days.

(21) Appl. No.: 14/297,038

(22) Filed: Jun. 5, 2014

(65) Prior Publication Data

US 2014/0361535 A1   Dec. 11, 2014

Related U.S. Application Data

(60) Provisional application No. 61/832,663, filed on Jun. 7, 2013.

(51) Int. Cl.
| | | |
|---|---|---|
| *F16L 13/14* | (2006.01) | |
| *B21D 39/04* | (2006.01) | |
| *F16L 23/024* | (2006.01) | |

(52) U.S. Cl.
CPC .......... *F16L 13/147* (2013.01); *B21D 39/046* (2013.01); *F16L 23/024* (2013.01); *F16L 2013/145* (2013.01)

(58) Field of Classification Search
CPC ................. F16L 13/147; B21D 39/046; Y10T 29/49909; Y10T 29/49911; Y10T 29/49879; Y10T 29/49927; Y10T 29/4992; Y10T 29/49994; Y10T 29/53917; Y10T 29/53987; Y10T 29/5367
USPC .................... 29/234, 243.15, 523
See application file for complete search history.

(56) References Cited

U.S. PATENT DOCUMENTS

| | | | | |
|---|---|---|---|---|
| 568,574 | A * | 9/1896 | Hoyer ................... | B21D 17/04 285/382.2 |
| 786,551 | A * | 4/1905 | Doolittle ............... | B21D 39/04 285/382.5 |
| 866,644 | A * | 9/1907 | Green .................. | B21D 39/06 227/152 |
| 943,117 | A * | 12/1909 | Lucas et al. .......... | B21D 39/20 29/523 |
| 1,242,627 | A * | 10/1917 | Winningham ......... | B21D 39/06 29/243.518 |
| 2,695,446 | A * | 11/1954 | Meyer .................. | B21D 39/06 165/178 |
| 2,748,463 | A * | 6/1956 | Mueller ............... | F16L 19/028 29/421.1 |

(Continued)

OTHER PUBLICATIONS

International Search Report and Written Opinion for International Application No. PCT/US2014/041082, dated Oct. 14, 2014, 15 pages.

*Primary Examiner* — Jason L Vaughan
(74) *Attorney, Agent, or Firm* — Foley & Lardner LLP (57) ABSTRACT

A method of connecting a first fitting to a second fitting to provide a fluid coupling between the first fitting and the second fitting includes providing a first fitting having an exterior surface; providing a second fitting having an interior surface and an annular groove provided on the interior surface; positioning the first fitting at least partially within the second fitting; and deforming the first fitting in a generally annular direction to form an annular ridge extending at least partially into the annular groove to couple the first fitting to the second fitting.

10 Claims, 7 Drawing Sheets

(56) References Cited

U.S. PATENT DOCUMENTS

| | | | | |
|---|---|---|---|---|
| 3,345,730 | A * | 10/1967 | Laverty | B21D 39/06 285/382.5 |
| 4,182,152 | A * | 1/1980 | Vaill | B21D 39/06 29/523 |
| 4,220,034 | A * | 9/1980 | Pogonowski | B21D 39/04 29/243.518 |
| 4,330,144 | A * | 5/1982 | Ridenour | B21D 39/04 285/382.5 |
| 4,450,618 | A * | 5/1984 | Ridenour | B21D 39/04 29/509 |
| 4,685,191 | A * | 8/1987 | Mueller | B21D 39/04 29/523 |
| 4,934,038 | A * | 6/1990 | Caudill | B21D 39/08 29/523 |
| 5,713,611 | A * | 2/1998 | Kurimoto | B21D 39/06 285/222 |
| 5,848,469 | A * | 12/1998 | O'Connor | B21D 39/044 29/523 |
| 5,934,711 | A | 8/1999 | Gady | |
| 6,116,833 | A | 9/2000 | Ellis | |
| 6,199,914 | B1 | 3/2001 | Duhn | |
| 6,286,213 | B1 * | 9/2001 | Hada | F02M 35/10144 29/507 |
| 7,025,384 | B2 | 4/2006 | Whitehead et al. | |
| 8,272,433 | B2 | 9/2012 | Duhn et al. | |
| 8,282,139 | B2 | 10/2012 | Kerin et al. | |
| 8,312,606 | B2 | 11/2012 | Reid et al. | |
| 8,313,124 | B2 | 11/2012 | Krausz et al. | |
| 8,857,036 | B2 * | 10/2014 | Kuebel | F16L 13/147 285/258 |
| 2001/0030422 | A1 | 10/2001 | Kerr et al. | |
| 2004/0066039 | A1 | 4/2004 | Muhammad et al. | |
| 2004/0150222 | A1 | 8/2004 | Ichimura et al. | |
| 2009/0139089 | A1 | 6/2009 | Miyazaki et al. | |
| 2010/0295296 | A1 | 11/2010 | Kawamata | |
| 2011/0215573 | A1 * | 9/2011 | Tanaka | B21D 39/04 285/382.7 |

* cited by examiner

CONNECTION ASSEMBLY

CROSS-REFERENCE TO RELATED PATENT APPLICATIONS

This application claims the benefit of U.S. Provisional Application No. 61/832,663, filed Jun. 7, 2013, which is incorporated herein by reference in its entirety.

BACKGROUND

The present disclosure relates generally to the field of connection assemblies usable to provide fluid-tight connections between components.

SUMMARY

One embodiment relates to a method of connecting a first fitting to a second fitting to provide a fluid coupling between the first fitting and the second fitting, the method comprising providing a first fitting having an exterior surface; providing a second fitting having an interior surface and an annular groove provided on the interior surface; positioning the first fitting at least partially within the second fitting; and deforming the first fitting in a generally annular direction to form an annular ridge extending at least partially into the annular groove to couple the first fitting to the second fitting.

Another embodiment relates to a connection assembly comprising a first component having an exterior surface defining an annular ridge; a second component having an interior surface and an annular groove provided on the interior surface; wherein the first component is received within the second component such that the annular ridge is extends radially outward at least partially into the annular groove to couple the first component to the second component.

Another embodiment relates to a connection kit comprising: a generally cylindrical tube comprising an annular deformable portion; and a connection flange comprising a base portion and an extending portion extending from the base portion, the extending portion comprising an interior surface defining a recess; wherein a portion of the tube is configured to be received within the connection flange and wherein the deformable portion on the tube is deformable into the recess of the connection flange.

DETAILED DESCRIPTION OF VARIOUS EMBODIMENTS

Referring to the figures generally, various embodiments disclosed herein relate to a connection assembly or components thereof that provide an "internal crimp" coupling feature for joining various components together (e.g., pipes, conduits, tubes, fittings, flanges, etc.). The present disclosure further relates to tooling methods for making or forming such connection assemblies. The embodiments disclosed herein are usable in a wide variety of applications relating to fluid connections and other types of connections, including heat exchangers, radiators, bathroom fixtures (e.g., faucet fixtures, shower fixtures, etc.), kitchen fixtures (e.g., faucet fixtures, etc.), general plumbing applications, appliances, equipment, and the like. All such applications are to be understood to be within the scope of the present disclosure.

Referring to FIGS. 1-5, according to one embodiment, a connection assembly 10 includes a first component 12 (e.g., a pipe, a conduit, a tube, a first fitting, etc.) and a second component 14 (e.g., a straight flange, a right angle flange, a second fitting, a fixture, a mounting bracket, etc.). One or both of first and second components 12 and 14 may further be connected to additional components, fittings, etc., shown in FIGS. 1-2 as a fixture 16 (e.g., a pump, valve, faucet, showerhead, etc.). Connection assembly 10 provides for fluid communication between components, such as between fixture 16 and other components, such as a variety of pipes, fixtures, etc.

Figure 10:
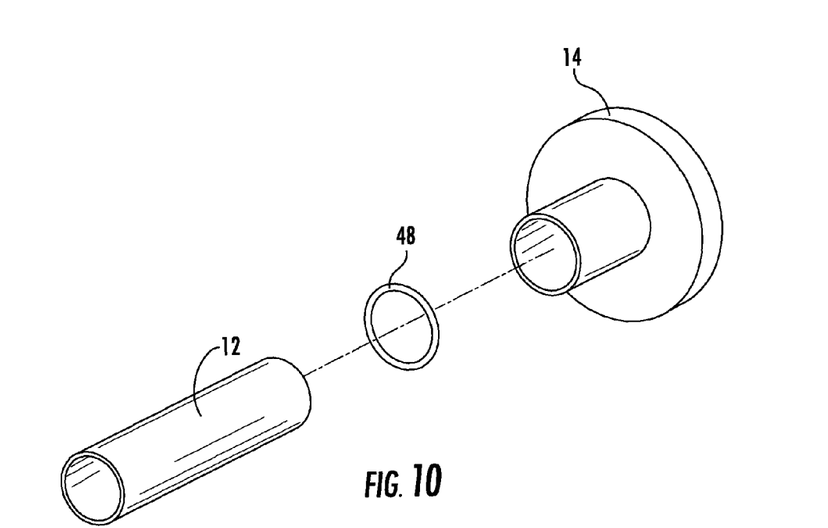

First component 12 includes a body 18 having inner surface 22, outer surface 24, and a bore 20 extending therethrough. In one embodiment, first component 12 has a generally cylindrical shape, while in other embodiments, first component 12 may take non-cylindrical shapes (e.g., have a non-circular cross-section, a curvature along the length of the component, etc.). First component 12 is configured to provide a portion of a fluid connection such that fluid is directed between a first end 26 and a second end 28 of first component 12. An example of first component 12 is shown in FIG. 10 prior to assembly with second component 14.

Figure 6:
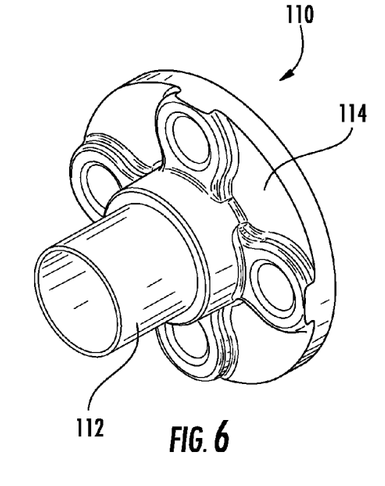
FIGS. 6-8 illustrate a connection assembly according to another embodiment.
Figure 7:
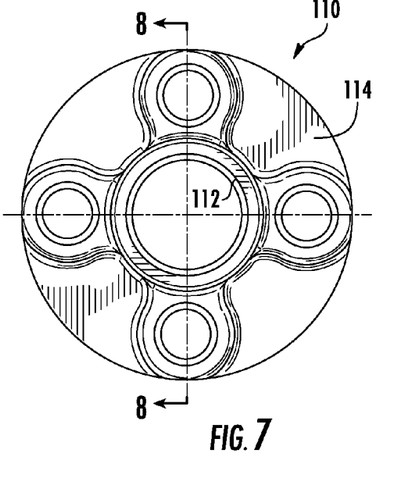

As shown in FIGS. 1-5, second component 14 is a right angle flange or fitting. Second component 14 includes a body 32 and a coupling flange 34. Coupling flange 34 enables coupling of second component 14 to further components (e.g., another flange, fitting, fixture, etc.) such as fixture 16. A bore 36 extends through body 32 from a first end 38 to a second end 40 to provide fluid flow through second component 14. Bore 36 in one embodiment is a generally cylindrical bore that turns 90 degrees within body 32. In other embodiments, bore 36 may take other forms, and provide other bends. In further embodiments, bore 36 may be generally straight (see, e.g., FIGS. 6-8).

Figure 1:
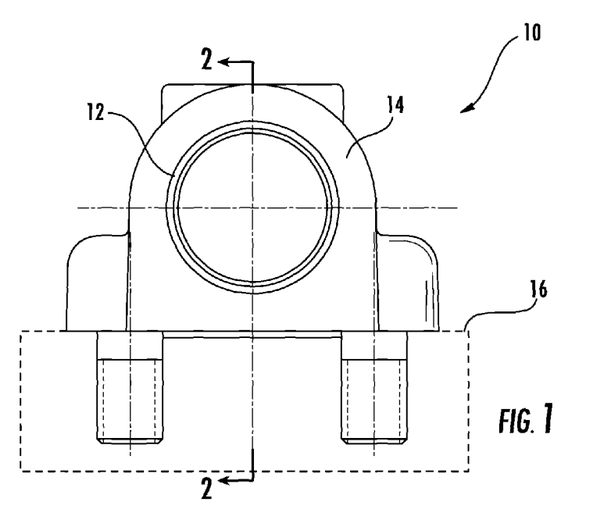
FIGS. 1-5 illustrate a connection assembly according to one embodiment.
Figure 2:
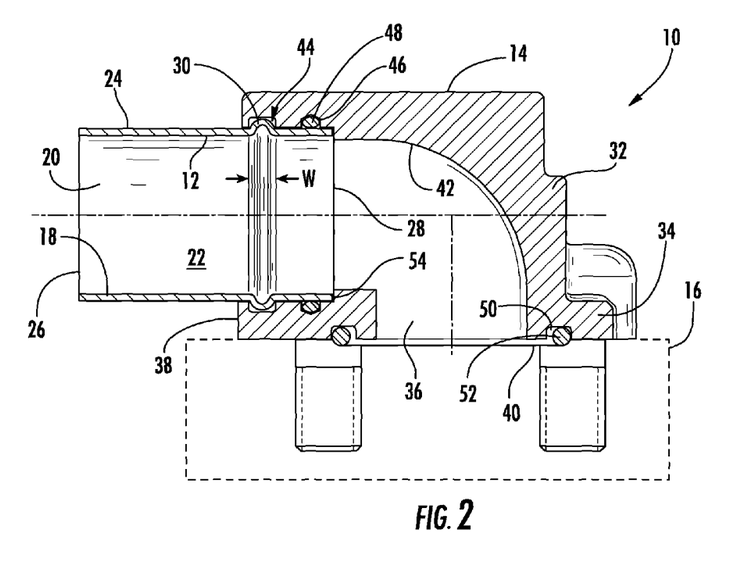
Figure 3:
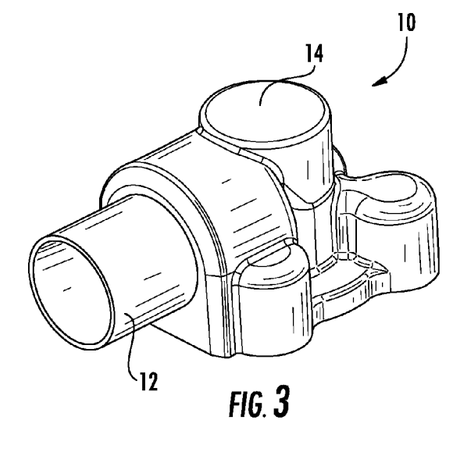
Figure 4:
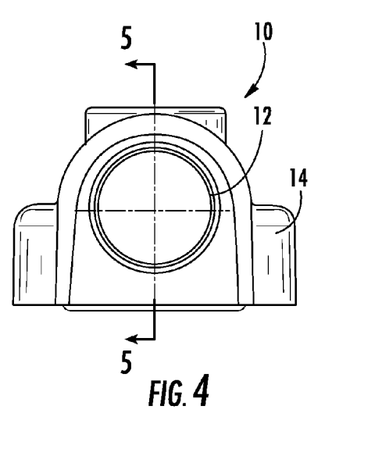
Figure 5:
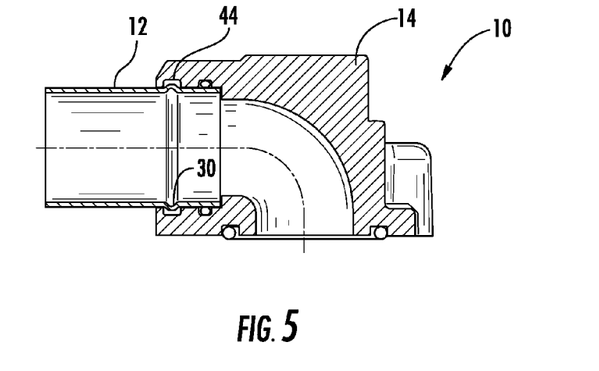

In one embodiment, one or more seals may be provided to ensure a fluid-tight connection between second component 14 and first component 12, fixture 16, or other components. For example, as shown in FIG. 2, second component 14 includes an annular seal groove 46 that is configured to receive a first sealing member 48 (e.g., an o-ring, gasket, seal, etc.). A face groove 50 provided at the second end 28 or face of second component 14 is configured to receive a second sealing member 52 (e.g., an o-ring, etc.). First and second seals 48, 52 can be made of any suitable material such as rubber, etc. that provides a fluid-tight coupling between components. In some embodiments, additional seals may be utilized. For example, a second seal adjacent sealing member 48 may be used to provide additional sealing between components. The second seal may be provided on the same or opposite side of crimp groove 44 relative to sealing member 48. Additional sealing components may be utilized in other locations according to yet further embodiments.

In one embodiment, second component 14 includes an inner surface 42 that defines a crimp groove 44 (e.g., a notch, recess, indent, etc.). As discussed further below, crimp groove 44 is configured to receive a portion of first component 12 to couple first and second components 12, 14 together. For example, as shown in FIG. 2, when assembled with second component 14, first component 12 includes an annular ridge 30 (e.g., a projection, external crimp, raised portion, etc.) that extends radially outward from outer surface 24 of first component 12 and into crimp groove 44 of second component 14. Annular ridge 30 of first component 12 and crimp groove 44 of second component 14 are sized and shaped to provide a secure mechanical connection between first and second components 12, 14. In some embodiments, the interface of annular ridge 30 and crimp groove 44 provides a sealing feature that is substantially impermeable to fluids (e.g., liquids and/or gases), while in other embodiments, additional seals may be provided to ensure proper sealing of components. In one embodiment, the connection of first component 12 and second component 14 is formed by radially expanding a portion of first component 12 after first component 12 is inserted into second component 14 to form annular ridge 30 that extends into crimp groove 44. The radial expansion of first component results in permanent (e.g., non-reversible, plastic, etc.) deformation of first component 12 that occurs after first and second components 12, 14 are assembled.

In use, a first component such as first component 12 is provided. As discussed above, first component 12 may be or include a generally cylindrical or tubular member. A second component such as second component 14 is provided. Second component 14 may be or include a straight flange, right angle flange, or other component. An end 28 of first component 12 is slid into internal bore 36 of second component 14 to a desired position. First and second components 12, 14 are configured with correspondingly-sized outer/inner diameters to have a relatively "snug" fit, such that seal 48 engages outer surface 24 of first component 12. In one embodiment, second component 14 includes an internal shoulder 54 configured to limit the extent to which first component 12 can be inserted into second component 14.

Once first component 12 is properly seated within second component 14, a tool (see, e.g., tool 60 shown in FIGS. 11-12 with a connection assembly 110) is used to expand (e.g., irreversibly deform, plastically deform, etc.) first component 12 radially outward into crimp groove 44. In one embodiment, crimp groove 44 has a width W (see FIG. 2) defined by a pair of opposing sidewalls that act to constrain the material of first component 12 during deformation such that annular ridge 30 has a width generally corresponding to width W of crimp groove 44. As shown in FIG. 2, annular ridge 30 forms a permanent and generally round ridge, or projection, such that there are no sharp corners that may otherwise provide potential fracture points or points of increased stress.

Figure 11:
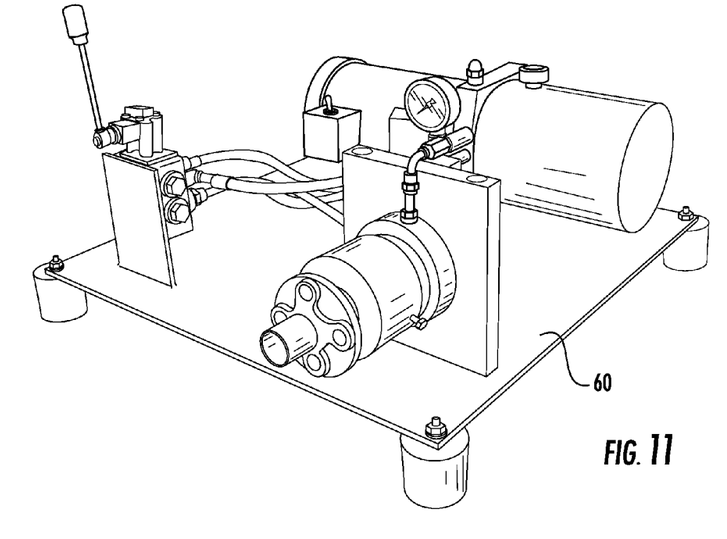
FIGS. 11-12 illustrate a tool usable to form a connection assembly according to one embodiment.
Figure 12:
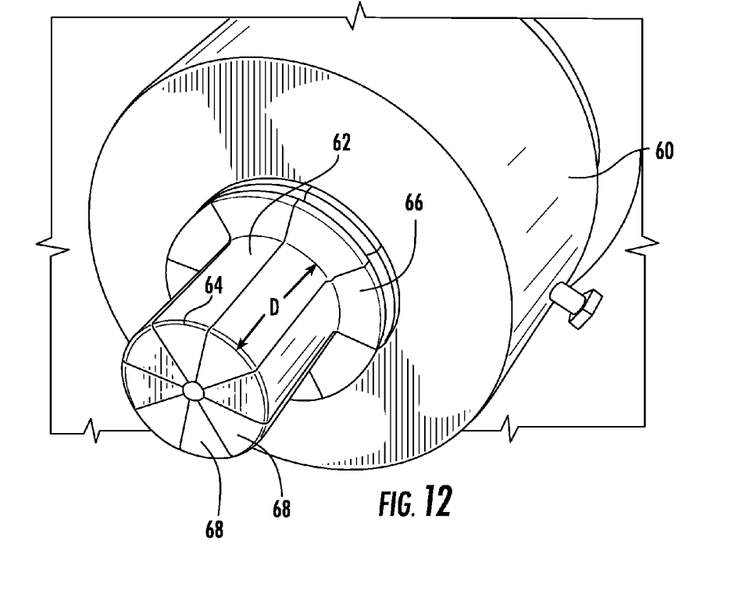

Referring to FIGS. 11-12, to couple first and second components 12, 14 together, tool 60 is provided with a radially expanding member 62 (e.g., a shaft, arbor, mandrel, etc.) configured to receive first and second components 12, 14. In one embodiment, member 62 includes an annular ring portion 64 that is configured to correspond in shape to the inner surface of annular ridge 30. Ring portion 64 may be positioned a distance D away from a base portion 66 such that when first and second components 12, 14 are slid onto member 62 proximate base portion 66, ring portion 64 is generally longitudinally aligned with crimp groove 44 on second component 14 and the desired position of annular ridge 30 on first portion 12. Expanding member 62 is then radially expanded (e.g., by way of a hydraulic actuation mechanism, etc.) to form annular ridge 30 within crimp groove 44. After forming annular ridge 30, expanding member 62 can be returned to a non-expanded state such that the connection assembly can be removed from tool 60.

In one embodiment, expanding member 62 includes a number of radially moveable sections 68 that are moveable in a radial direction to provide for the expansion of expanding member 62. Other types of mechanisms may be utilized to provide radial expansion features according to various alternative embodiments. Tool 60 may be bench-mounted, self-standing, or a portable, hand-held tool according to various alternative embodiments.

Figure 15:
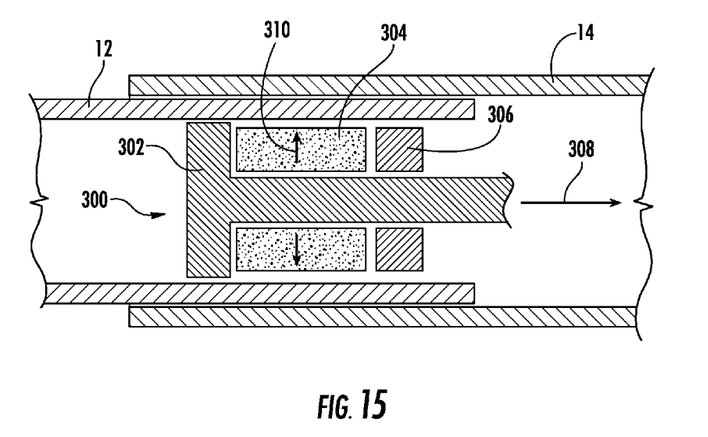
FIG. 15 illustrates a tool usable to form a connection assembly according to another embodiment.

Referring to FIG. 15, in some embodiments a tool such as tool 300 is used to expand first and second components 12, 14. As shown in FIG. 15, tool 300 includes a first or movable member 302, a compressible member 304, and a second or stationary member 306. In operation, movable member 302 moves in the direction of arrow 308 while stationary member 306 remains fixed in position. As a result of the longitudinal compression of compressible member 304, compressible member 304 moves radially outward in the direction of arrow 304. As a result of the radial expansion of member 304, first and second components 12, 14 are deformed radially outward to form a connection. Members 302, 304, 306 are generally sixed to fit snugly within first member 12, and may have a cylindrically-shaped periphery.

While FIG. 15 shows movable member 302 moving relative to stationary member 306, according to other embodiments, relative movement between members 302, 306 may be provided in different ways, including moving both of members 302, 306, moving only member 306, etc. In one embodiment, compressible member 304 is a rubber or similar material, while in other embodiments, other materials may be used that provide the desired compressibility characteristics. Compressible member 304 may have variable stiffness/compressibility characteristics such that certain portions of member 304 are more easily compressed and/or deformable. This may facilitate controlling the location of expansion of first and second members 12, 14.

While connection assembly 10 is shown in FIGS. 1-5 to include second component 14 as a right angle flange, in other embodiments, first or second component 12, 14 can take other forms. For example, referring to FIGS. 6-8, in one embodiment a connection assembly 110 can include first component 112 and a second component 114 shown as a straight flange. First component 112 can be identical or similar to first component 12. Second component 114 includes a body 132 having a flange 134 and a cylindrical extension 135. A bore 133 extend from a first end 136 to a second end 138, and one or more apertures may extend through flange 134 to accommodate mounting fasteners, etc.

Figure 8:
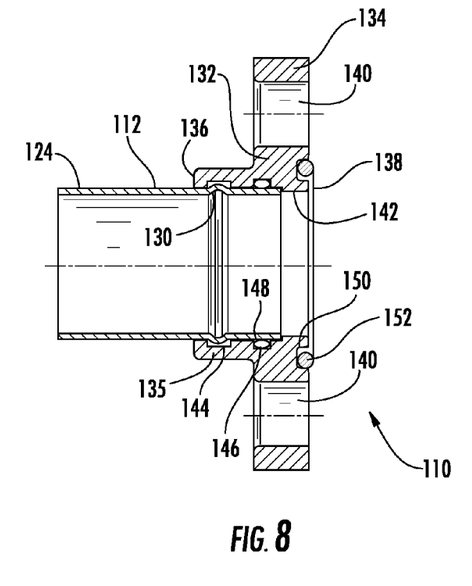
Figure 9:
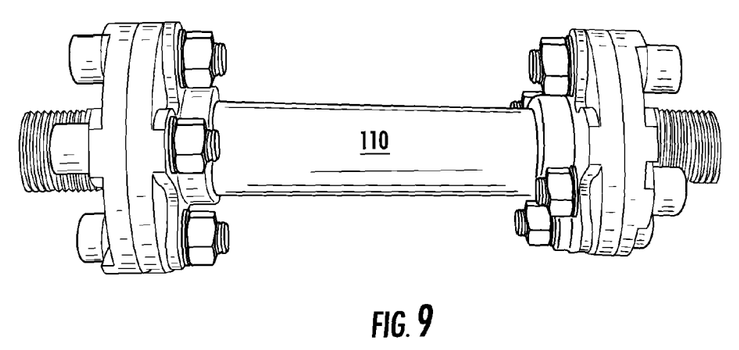
FIGS. 9-10 illustrate various connection assemblies and components thereof according to various embodiments.

In one embodiment, one or more seals may be provided to ensure a fluid-tight connection between second component 114 and first component 112, a fixture such as fixture 16, or other components. For example, as shown in FIG. 8, second component 114 includes an annular seal groove 146 that is configured to receive a first sealing member 148 (e.g., an o-ring, etc.). A face groove 150 provided at the second end 138 or face of second component 114 is configured to receive a second sealing member 152 (e.g., a rubber o-ring, etc.). First and second seals 148, 152 can be made of any suitable material such as rubber, etc. that provides a fluid-tight coupling between components.

In one embodiment, second component 114 includes an inner surface 142 that defines a crimp groove 144. As similarly discussed above with respect to connection assembly 10, crimp groove 144 is configured to receive a portion of first component 112 in order to couple first and second components 112, 114 together. For example, as shown in FIG. 8, when assembled with second component 114, first component 112 includes an annular ridge 130 (e.g., a projection, external crimp, raised portion, etc.) that extends radially outward from outer surface 124 of first component 112 and into crimp groove 144 of second component 114 Annular ridge 130 of first component 112 and crimp groove 144 of second component 114 are sized and shaped to provide a secure mechanical connection between first and second components 112, 114. In one embodiment, the connection is formed by radially expanding a portion of first component 114 to form annular ridge 130 that extends into crimp groove 144.

Connection assembly 110 may be formed using the same or similar tooling as that used to form connection assembly 10. Furthermore, due to the straight configuration of second component 114, the tooling may be inserted from either end of the assembly. For example, a tool such as tool 60 may be inserted into second component 114 either from the same end (e.g., first end 136) as first component 112, or from the opposite end (e.g., second end 138).

Figure 13:
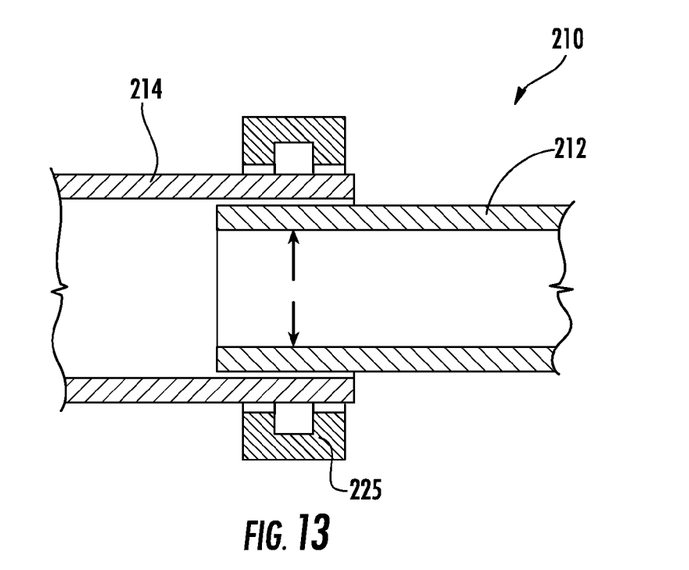
FIGS. 13-14 illustrate a connection assembly according to yet another embodiment.
Figure 14:
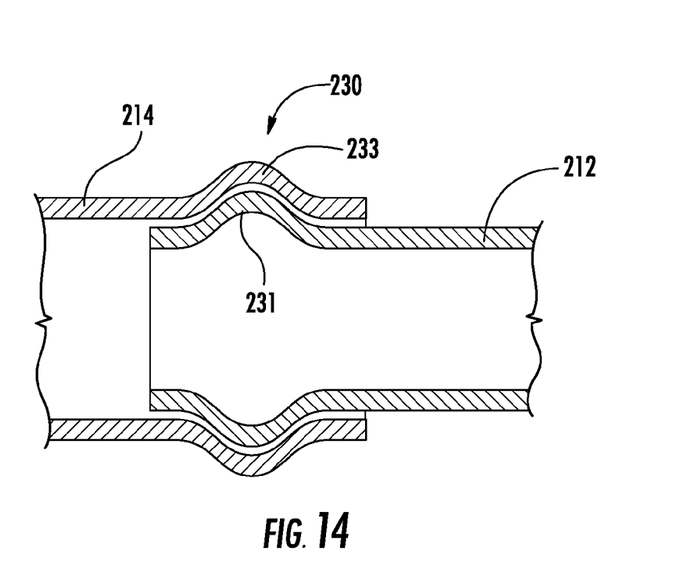

Referring to FIGS. 13-14, a connection assembly 210 is shown according to one embodiment. Connection assembly 210 includes two generally circular fittings 212, 214 (e.g., pipes, tubes, etc.) To form connection assembly 210, first component 212 is slid within second component 214. A "clamshell" form 225 (e.g., a fixture, etc.) is secured over the overlapping portions of components 212, 214, and a tool, which may be similar in function to tool 60, is inserted into first and second components 212, 214 in a generally longitudinally aligned position with form 225. The tool is then expanded radially as shown in FIG. 13 such that corresponding annular ridges 231 and 233 are formed on first and second components 212, 214 to form a joint 230. Form 225 limits the deformation of first and second components 212, 214 in both height and width. Once joint 230 is formed, the tool and form 225 may be removed.

While as shown in the figures connection assemblies 10, 110, 210 are generally shown as having a single annular ridge/crimp groove, it should be noted that according to various alternative embodiments, multiple annular ridges and crimp grooves (e.g., spaced longitudinally along the first and second components) can be utilized to provide additional strength, sealing, or other properties. Furthermore, while the first and second components discussed herein are shown as being joined at generally cylindrical portions having circular cross-sections, it should be noted that according to various alternative embodiments other cross-sectional shapes may be used (e.g., oval, D-shaped, polygonal, etc.).

The various components disclosed herein may be made of any suitable material, including copper, stainless steel, or other materials. Further, the components may take any suitable size to accommodate, for example, particular fluid flow requirements, fluid pressure requirements, etc. Further yet, according to various alternative embodiments, the various features disclosed with respect to connection assemblies 10, 110, and 210 may be used alone or in combination to suit a particular application. All such features and combinations of features are to be understood to be within the scope of the present disclosure.

The connection assembly disclosed herein provides many advantages over more typical connection assemblies. For example, the connections disclosed herein may require less time and equipment than conventional connections, such as connections that utilize brazing. The brazing or other operation may take additional time and equipment. Furthermore, additional cleaning of the components is often required after a brazing or similar operation. As such, the overall productions costs of the connection assembly may be reduced. Additionally, the connection assembly and components disclosed herein may provide improved strength and/or durability, particularly in the context of high pressure fluid applications. For example, the connections disclosed herein may have burst limits of 1100 psi or more.

It should be understood that the construction and arrangement of the elements of the connection assembly shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. Some like components have been described in the present disclosure using the same reference numerals in different figures. This should not be construed as an implication that these components are identical in all embodiments; various modifications may be made in various different embodiments. It should be noted that the components and/or assemblies of the connection assembly may be constructed from any of a wide variety of materials that provide sufficient strength or durability, in any of a wide variety of colors, textures, and combinations.

What is claimed is:

1. A method of connecting a first fitting to a second fitting to provide a fluid coupling between the first fitting and the second fitting, the method comprising:
   providing a first fitting having an exterior surface;
   providing a second fitting having an extension and a flange extending radially outward from the extension, wherein the flange includes a predominately flat surface that defines an annular sealing groove, wherein the flange defines a plurality of apertures and each aperture in the plurality of apertures is configured to receive a fastener, wherein the extension includes an interior surface and an annular groove provided on the interior surface, and wherein the annular sealing groove is configured to receive a sealing member therein;
   positioning the first fitting at least partially within the extension of the second fitting;
   providing a tool having a plurality of sections configured to move radially outward relative to a longitudinal axis of the tool via a hydraulic actuation mechanism;
   inserting the tool into an interior of the first fitting; and
   expanding the first fitting in a generally annular direction via an actuation of the hydraulic actuation mechanism to cause a movement of the plurality of sections of the tool to form an annular ridge extending at least partially into the annular groove to couple the first fitting to the second fitting.

2. The method of claim 1, wherein expanding the first fitting forms a second annular groove on an interior surface of the first fitting substantially longitudinally aligned with the annular ridge provided on the exterior surface of the first fitting.

3. The method of claim 1, wherein the annular ridge comprises a generally curved profile.

4. The method of claim 1, wherein the interior surface of the second fitting defines a shoulder configured to limit the travel of the first fitting within the second fitting.

5. The method of claim 1, wherein the interior surface of the second fitting comprises a second annular sealing groove intended to receive a second sealing member therein, the second sealing member configured to provide a seal between the exterior surface of the first fitting and the second fitting.

6. The method of claim 1, wherein the annular ridge of the first fitting defines a first outer diameter that is greater than an inner diameter defined by the interior surface of the extension.

7. The method of claim 1, wherein the annular groove provided on the interior surface of the second fitting has a generally rectangular cross-section.

8. The method of claim 1, wherein the first fitting has a generally constant thickness along the length of the first fitting prior to the expansion of the annular ridge.

9. The method of claim 1, wherein expanding the first fitting comprises using a form disposed over overlapping surfaces of the first fitting and the second fitting.

10. The method of claim 1, further comprising:

providing a third fitting having a plurality of apertures, wherein each aperture in the plurality of apertures of the third fitting is configured to receive a fastener;

aligning a first aperture of the plurality of apertures of the second fitting with a second aperture of the plurality of apertures of the third fitting to form an aligned pair of apertures; and inserting a fastener through each aligned pair of apertures to couple the third fitting to the second fitting such that the sealing member provides a fluid-tight connection between the second fitting and the third fitting.

* * * * *